(12) United States Patent
Shimoda et al.

(10) Patent No.: US 6,397,079 B1
(45) Date of Patent: *May 28, 2002

(54) AUGMENTING THE CAPABILITIES OF TRANSCEIVERS

(75) Inventors: Marion H. Shimoda, Aloha; Kelan C. Silvester, Portland, both of OR (US); Gunjeet Bawaja, Sunnyvale, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,651

(22) Filed: Mar. 10, 1999

Related U.S. Application Data

(63) Continuation of application No. 09/154,265, filed on Sep. 16, 1998, now abandoned.

(51) Int. Cl.[7] ................................................. H04B 1/40
(52) U.S. Cl. ..................... 455/557; 455/563; 455/564; 455/418
(58) Field of Search ........................... 455/575, 90, 66, 455/73, 550, 556, 557, 566, 567, 347, 350, 563, 564, 418; 379/357, 429, 433; 704/246, 251, 275, 270

(56) References Cited

U.S. PATENT DOCUMENTS

| 4,731,811 | A | * | 3/1988 | Dubus ........................ 455/563 |
| 5,131,029 | A | * | 7/1992 | Kunstadt .................... 455/564 |
| 5,408,520 | A | * | 4/1995 | Clark et al. ................. 455/557 |
| 5,444,869 | A | * | 8/1995 | Stricklin et al. ............ 455/575 |
| 5,566,226 | A | * | 10/1996 | Mizoguchi et al. ......... 379/357 |
| 5,628,055 | A | * | 5/1997 | Stein ........................... 455/90 |
| 5,752,232 | A | * | 5/1998 | Basore et al. .............. 704/275 |
| 5,805,672 | A | * | 9/1998 | Barkats et al. ............. 455/563 |
| 6,216,013 | B1 | * | 4/2001 | Moore et al. ............... 455/557 |
| 6,226,532 | B1 | * | 5/2001 | Kim et al. .................. 455/563 |

* cited by examiner

Primary Examiner—Lester G. Kincaid
(74) Attorney, Agent, or Firm—Trop, Pruner & Hu, P.C.

(57) ABSTRACT

A computer system may be operated to enhance the functions available with a transceiver such as a cellular telephone, for example by providing enhanced memory and processing capabilities. In some embodiments, the computer can be linked to a cellular telephone to provide advanced speech recognition functions, language translation functions and encryption and authentication functions which may not be feasibly implemented in cellular telephones of relatively small size. For example, the computer system could be a portable computer system linked to a docking station which receives the cellular telephone. Alternatively, the cellular telephone and the computer may communicate by infrared or radio wave communications.

20 Claims, 4 Drawing Sheets

AUGMENTING THE CAPABILITIES OF TRANSCEIVERS

CROSS REFERENCE TO RELATED APPLICATIONS

This is a continuation of application Ser. No. 09/154,265, filed Sep. 16, 1998, now abandoned.

BACKGROUND

This invention relates generally to computer systems and to the use of computers in connection with transceivers such as cellular telephones.

Cellular telephones may provide message services, text services, telephone answering capabilities, telephone number directories, calculator features and the like. As the uses for cellular telephones increase, the demands on those telephones should increase at the same time.

However, many users prefer the cellular telephone to be of relatively small size. Thus, the types of telephone capabilities which are possible, given a relatively small available volume, are ultimately limited. A number of features have not been provided in connection with cellular telephones which are available in personal computers, for example.

Thus, it would be desirable to provide transceivers, such as cellular telephones, which have enhanced capabilities.

SUMMARY

In accordance with one embodiment, a method for enhancing the capability of a transceiver or telephone using a computer system includes receiving a command in the computer system. A software routine on the computer is involved to handle the command. The received command is processed and a transmission is encoded on the computer system to cause an event to occur on the transceiver. The transmission is transmitted to the transceiver.

DETAILED DESCRIPTION

The capabilities of a transceiver (or transmitter/receiver), such as a cellular telephone, may be enhanced by coupling the cellular telephone to a computer system such as a portable computer. In this way the enhanced capabilities of the computer system, including enhanced storage devices, higher processing capabilities, and other features may be applied through the use of software to enhance the capabilities of the transceiver. In other words, tasks which are computationally intensive, require particular peripheral devices, or enhanced storage capabilities, as examples, may be offloaded from the transceiver to the computer system.

Figure 1:
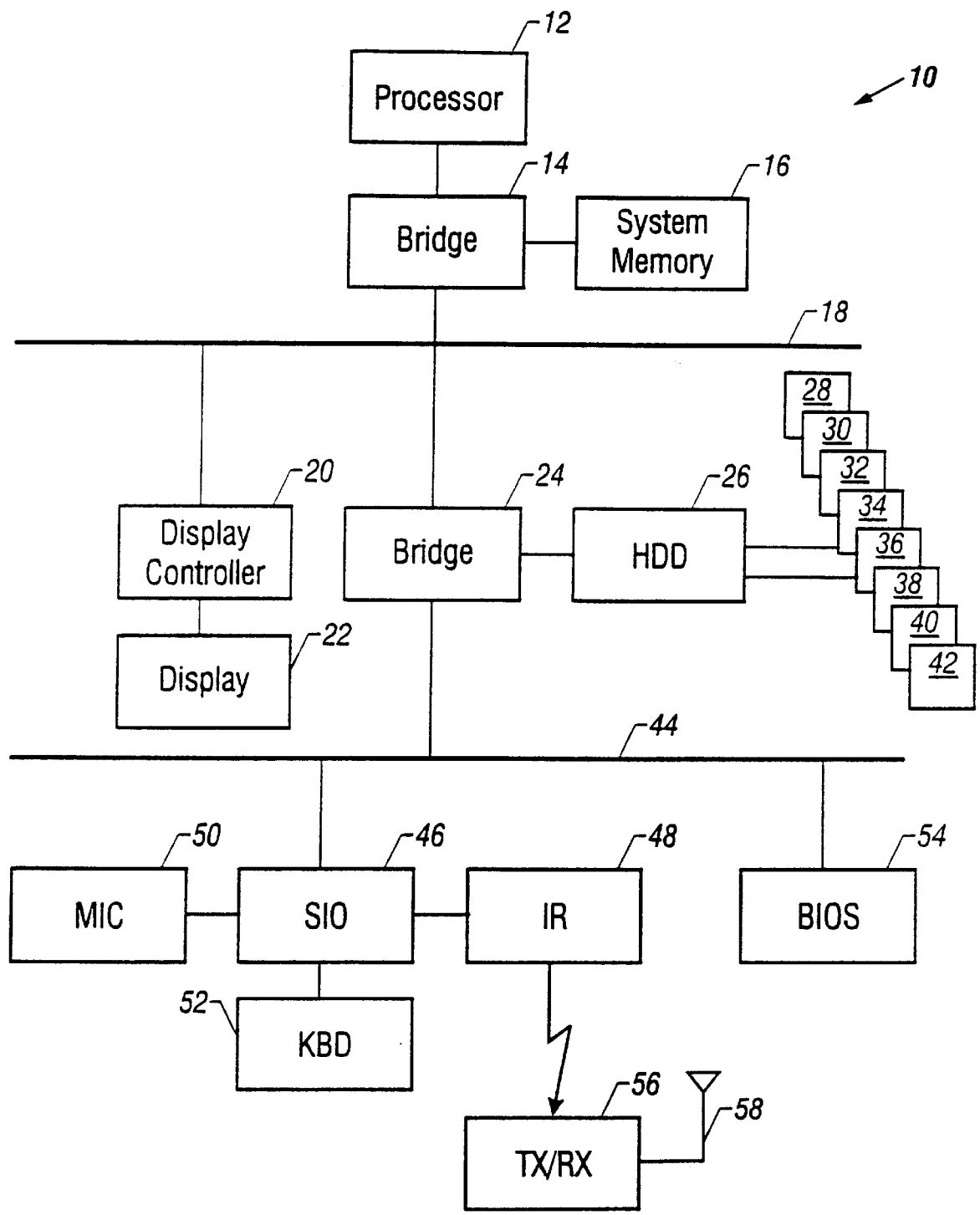
FIG. 1 is a block diagram of a computer system which may operate with a transceiver.

Referring to FIG. 1, a combined computer system and transceiver 10 may include a processor 12 coupled to a bridge 14. The bridge 14 is conventionally coupled to system memory 16 and to a bus 18. The bus 18 may be coupled to a display controller 20 and a display 22 as well as a bridge 24. The bridge 24 may couple a hard disk drive 26 and a second bus 44. The hard disk drive 26 may have a-number of software routines stored thereon, including routines or modules 28, 30, 32, 34, 36, 38, 40, and 42 as illustrated.

The bus 44 may couple a serial input/output (SIO) device 46 which connects to an infrared adapter 48, a keyboard 52 and a microphone 50. The infrared adapter 48 may communicate with the transceiver 56 and its antenna 58. The communication may be in accordance with well known protocols including those set forth by the Infrared Data Association (which can be found at {www.irda.com}). In addition the communication can occur over a cable connection or by radio wave communications. The bus 44 also couples a basic input/output system (BIOS) 54.

Figures 2, 3:
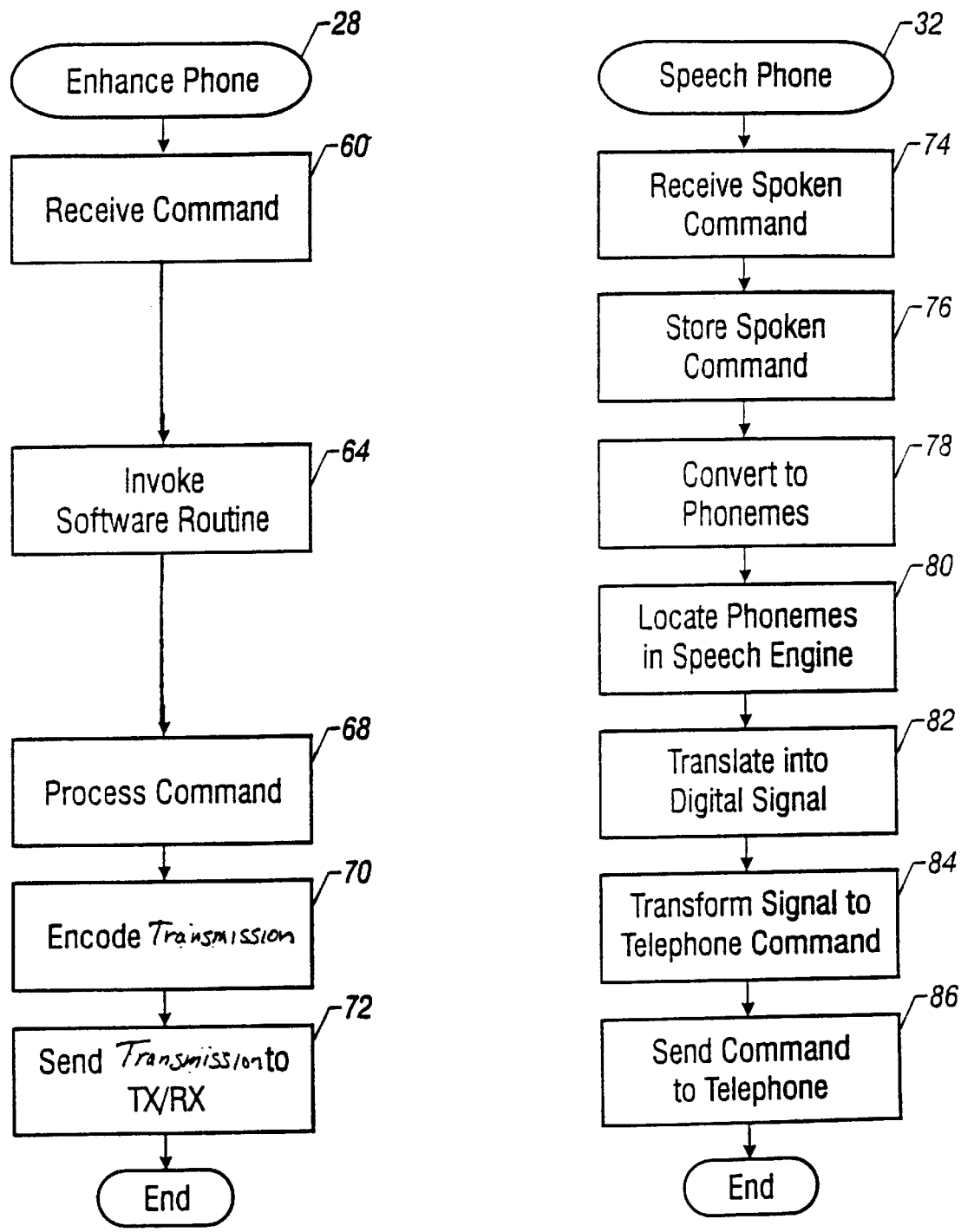
FIG. 2 is a flow chart showing an exemplary flow for implementing the coordination of the computer system capabilities with the transceiver as shown in FIG. 1.
FIG. 3 is a more detailed embodiment of a software routine which may be utilized on the computer system shown in FIG. 1.

The "EnhancePhone" routine 28, initially stored on the hard disk drive 26, enables the processing and memory capabilities of a computer, such as a portable computer, to be applied to augment certain capabilities of the transceiver 56. Referring to FIG. 2, a command is received by the computer system as indicated in block 60. The command could be received from a user or through a peripheral device coupled by a wire or wireless connection, as examples. In response to the command, a software routine is invoked to handle the command, which routine may be stored on the hard disk drive 26, as indicated at block 64. Using the software capabilities, the command may be processed by the processor 12 as indicated in block 68.

As a result of the processing, a transmission is developed which may be encoded at block 70 and transmitted to the transceiver as indicated in block 72. The transmission may include instructions that may provide relatively simple directions to the transceiver, corresponding to the capabilities of the transceiver. The transmission may cause an event to be implemented by the telephone. For example, in response to a spoken command recognized by the computer, the transceiver may initiate a call.

Referring now to FIG. 3, a particular embodiment of the routine described in FIG. 2, called "SpeechPhone", may be implemented by a software routine 32. The software routine 32 may use a database 34. A spoken command is received by the microphone 50 of the computer system 10. The spoken command may be temporarily stored as indicated in block 76 and converted to a format associated with a speech engine (block 78). The speech engine may, for example work with phonemes. Phonemes are parts of speech which may be compared to existing databases to identify those parts of speech and to convert them to digital representations. The phonemes may then be located in the phoneme database as indicated in block 80. The phonemes may be translated into a signal (block 82) and the signal may be transformed to a telephone command as indicated in block 84. The command may then be sent to the transceiver 56, as indicated in block 86.

In this way a telephone may be provided with advanced speech recognition capabilities. Instead of requiring relatively simple stored commands to be identified in the telephone, more advanced phoneme-based speech recognition may be provided (by implementing it in a connected computer system). This allows the user to generate a given command in a variety of different ways which are all recognized by the speech engine. As a result, more normal speech communications may be had with the telephone, using the enhanced speech recognition features possible with a portable computer system.

Figure 4:
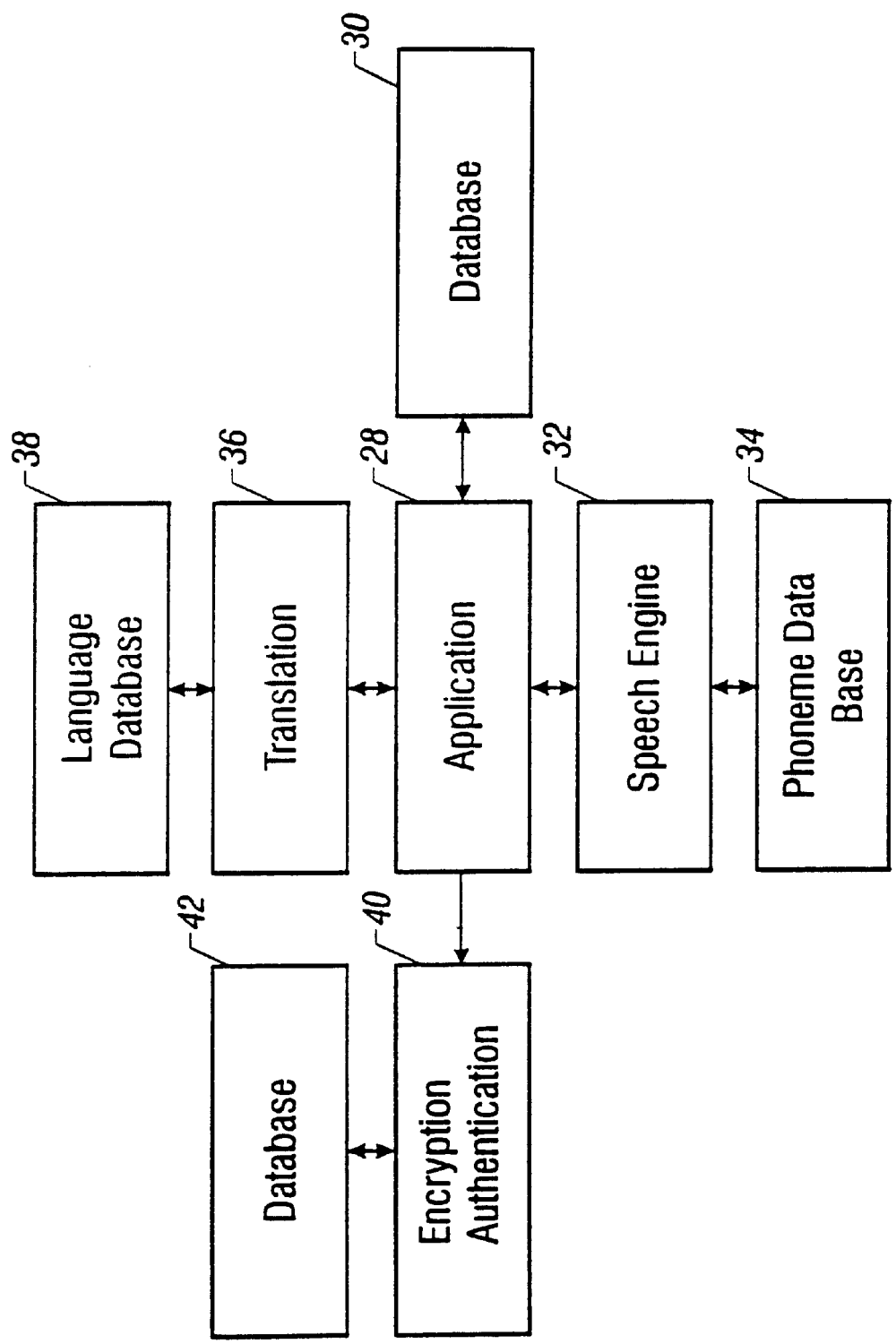
FIG. 4 is an alternative software routine which can be used on the computer system of FIG. 1.

Referring now to FIG. 4, the interaction between an application 28 running on the computer system and the capabilities provided for the transmitter/receiver is illustrated. The application 28, such as the one illustrated in FIG. 2, may control a variety of operations of the computer system associated with implementing an enhanced transceiver functionality. Thus, the application 28 may use a database 30 to implement its capabilities. The application 28 can call a speech engine 32 and its phoneme database 34 to provide fast speech recognition functions for the connected cellular telephone. For example, the instructions from the computer system may cause the telephone to automatically dial a given telephone number and generate a spoken statement.

The system can also use a language database 38 and a translation program 36 to provide advanced language translation for the telephone user. In this way, the telephone user can receive real time translations of the spoken words generated by a caller or can send translated messages over the telephone to another person who speaks a different language.

Similarly, the application 28 can call an encryption and authentication routine 40 which uses a database 42. Using this technique, the transceiver may implement a relatively advanced encryption and authentication routine which may not be possible given the constraints of normal cellular telephones. In addition, the user is not burdened with obtaining a relatively expensive telephone for features which may not be used all of the time. Instead the user can obtain the software that provides the enhanced capabilities when needed, through his or her computer system.

Figure 5:
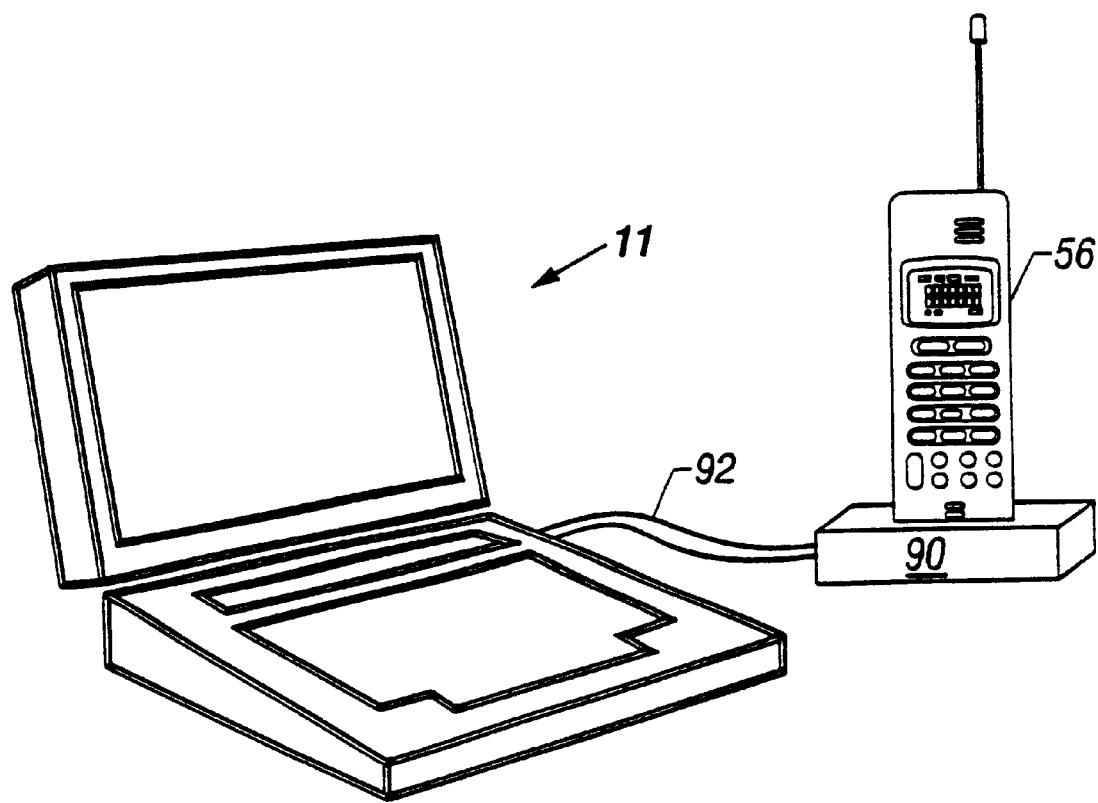
FIG. 5 is a perspective view of a portable computer coupled to a cellular telephone.

Referring now to FIG. 5, one embodiment for connecting a transceiver 56, such as a cellular telephone, to a computer 11, which could be a portable computer system, uses a docking base 90 which receives one end of the transceiver having appropriate connectors (not shown) thereon and communicates with the computer 11 through a wireless or wire connection 92. In this way the transceiver 56 may communicate with the computer 11 so that the enhanced capabilities may be easily provided from the computer system to the telephone in a relatively rapid fashion. The base 90 could also function as a conventional battery charging base when connected to an appropriate AC adapter.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for enhancing the capabilities of a transceiver using a computer system comprising:

receiving a command on a computer system to implement a function not available through the transceiver;

invoking a software routine on the computer system to handle the command;

reading data from a database;

processing the command on the computer system;

encoding on the computer system a set of instructions in a format compatible with the format used on said transceiver in order to cause an event to occur through the execution of those instructions on the transceiver; and transmitting said set of instructions to said transceiver.

2. The method of claim 1 wherein invoking said software routine includes invoking a speech recognition software routine.

3. The method of claim 1 wherein transmitting includes transmitting instructions using infrared transmissions.

4. The method of claim 1 wherein transmitting includes transmitting instructions using radio wave transmissions.

5. The method of claim 1, further comprising receiving the command from a peripheral device connected to the computer system.

6. The method of claim 1 wherein transmitting involves transmitting instructions over a wire link.

7. The method of claim 1 further including automatically dialing a given party in response to said transmission.

8. The method of claim 1 including encoding a transmission that contains instructions for said transceiver.

9. An article comprising a medium for storing instructions that enable a computer to:

receive a command on the computer to implement a function not available through a transceiver;

invoke a speech recognition software routine to handle the command;

read data from a database that is part of a speech engine;

process the command;

encode a set of instructions in a format compatible with the format used on said transceiver in order to cause an event to occur through the execution of those instructions on said transceiver; and transmit the instructions to the transceiver.

10. A computer system for providing enhanced capabilities to a transceiver comprising:

a processor;

memory associated with said processor;

said memory storing a software routine which enables the computer system to:
  receive a command on the computer system to implement a function not available through a transceiver;
  store the command on the computer system;
  invoke a software routine on the computer system to handle the command;
  read data from a database on the computer system;
  process the command on the computer system;
  encode on the computer system a set of instructions in a format compatible with the format used on said transceiver in order to cause an event to occur through the execution of those instructions on the transceiver; and
  transmit said instructions to said transceiver.

11. The system of claim 10 including an infrared interface.

12. The system of claim 10 including a radio wave interface.

13. The system of claim 10 including a wire link between said transceiver and said computer system.

14. The system of claim 13 including a docking station that receives said transceiver and connects said transceiver to said computer system.

15. The system of claim 10, further comprising a peripheral device that generates the command received by the computer.

16. The system of claim 15, wherein the peripheral device includes a microphone.

17. The system of claim 10 wherein said transceiver is a telephone.

18. The system of claim 10 wherein said computer system is a portable computer.

19. The system of claim 10 including a software routine for implementing a speech recognition function.

20. The system of claim 19 including a database for implementing a speech engine.

* * * * *